No. 627,115. Patented June 20, 1899.
W. V. HART.
POTATO PLANTER AND FERTILIZER DISTRIBUTER.
(Application filed Apr. 27, 1898.)
(No Model.) 2 Sheets—Sheet 1.
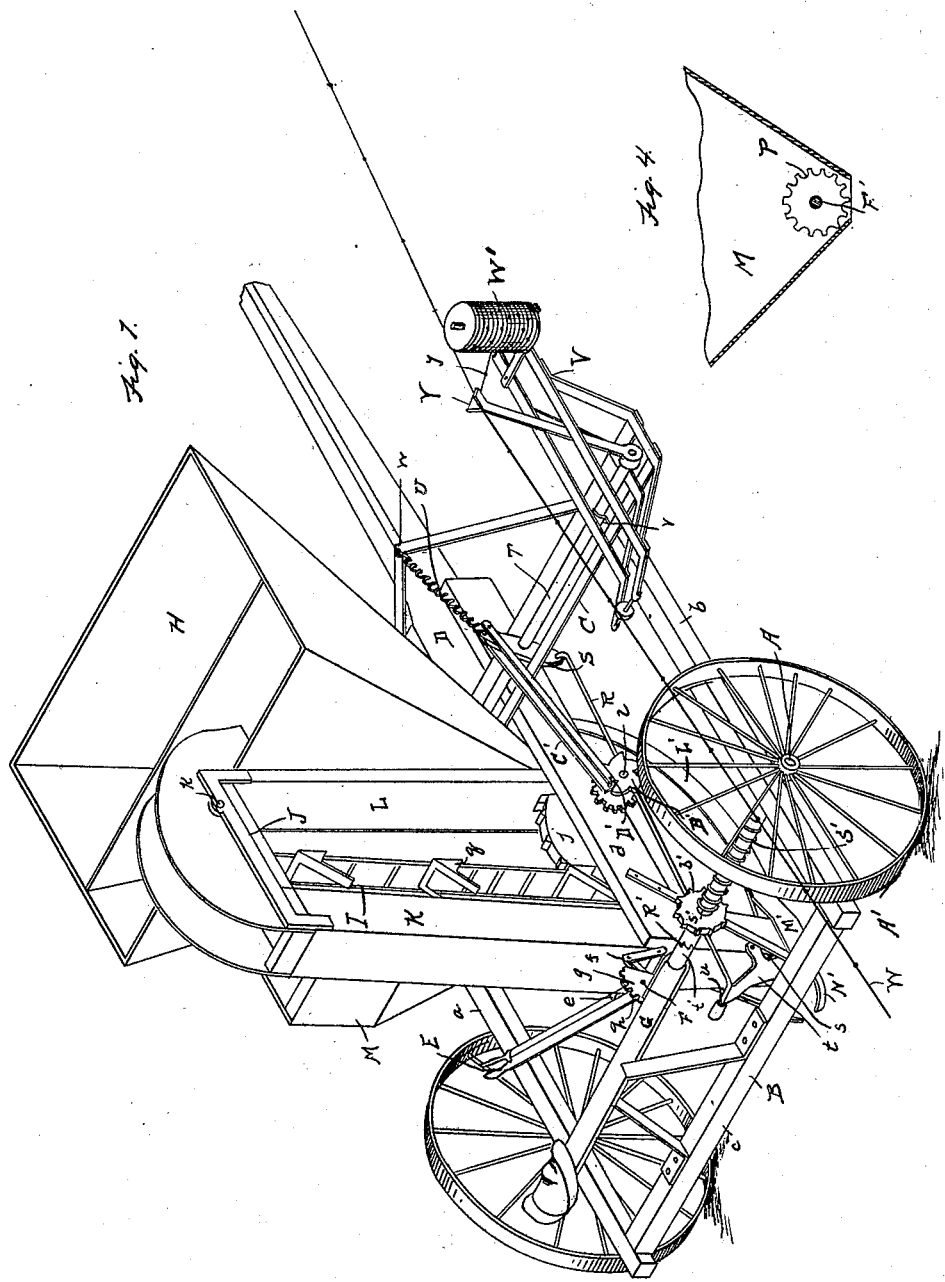
WITNESSES
C. P. Lukan
J. H. Dougherty
INVENTOR
Walter V. Hart
By C. W. Bradford
Attorney No. 627,115. Patented June 20, 1899.
W. V. HART.
POTATO PLANTER AND FERTILIZER DISTRIBUTER.
(Application filed Apr. 27, 1898.)
(No Model.) 2 Sheets—Sheet 2.
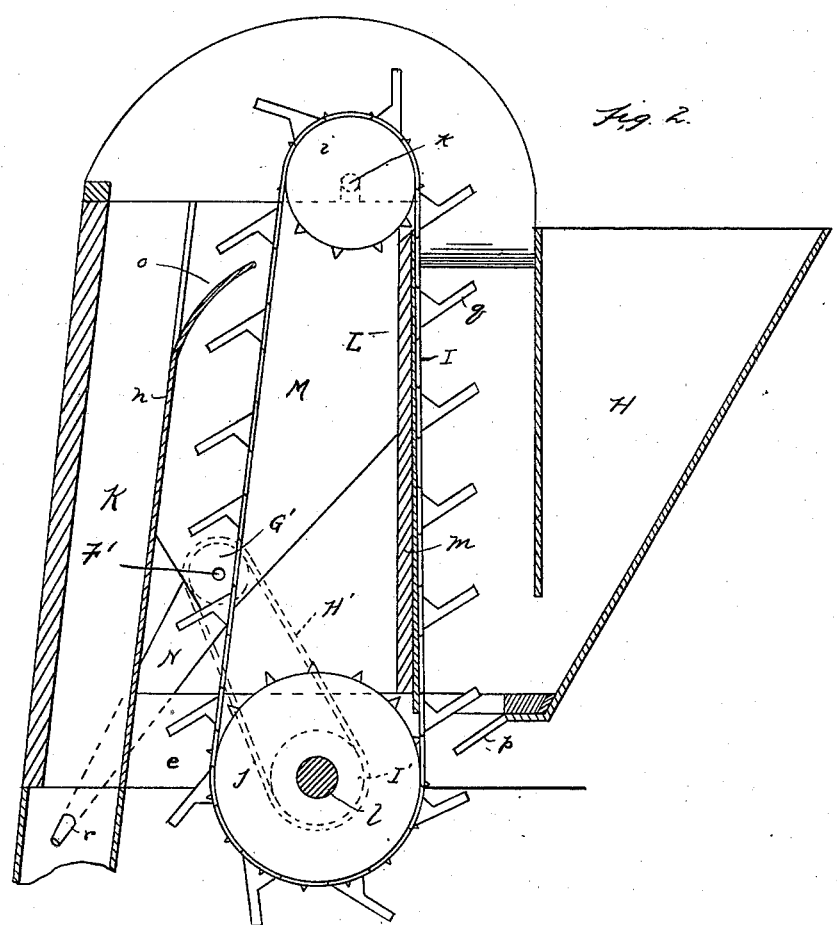
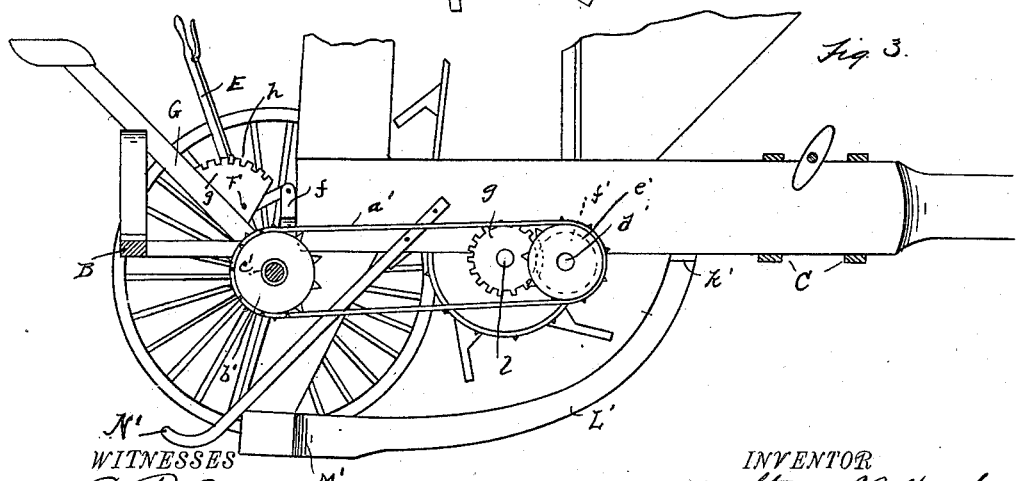

UNITED STATES PATENT OFFICE.

WALTER V. HART, OF WHEELER, INDIANA.

POTATO-PLANTER AND FERTILIZER-DISTRIBUTER.

SPECIFICATION forming part of Letters Patent No. 627,115, dated June 20, 1899.

Application filed April 27, 1898. Serial No. 679,012. (No model.)

*To all whom it may concern:*

Be it known that I, WALTER V. HART, a citizen of the United States, residing at Wheeler, in the county of Porter and State of Indiana, have invented certain new and useful Improvements in Potato-Planters and Fertilizer-Distributers; and I do hereby declare the following to be a full, clear, and exact description of the invention, such as will enable others skilled in the art to which it appertains to make and use the same, reference being had to the accompanying drawings, forming a part of this specification.

This invention relates to potato-planters and fertilizer-distributers, and has for its object to provide a combined machine that may be adjusted to distribute the potato-seed and fertilizer either in drilled rows or hills.

The invention consists in the general construction and arrangement of the various parts, to be hereinafter described and claimed.

Referring to the accompanying drawings, Figure 1 shows a general perspective view of my improved planter. Fig. 2 is a vertical section through the main hopper and feed-tube, showing the relation therewith of the carriers. Fig. 3 is a side elevation of the auxiliary frame and a portion of the driving mechanism, and Fig. 4 is a sectional view of the fertilizer-hopper.

Like letters of reference refer to corresponding parts throughout the drawings.

A represents the main axle, upon which the framework for supporting the mechanism is carried. The frame B is constructed to a U form in the two sides $a$ $b$ and the end $c$. The two sides are provided with suitable boxes to engage with the axle above referred to, so that the frame may rock thereon, and the forward ends are hinged to the cross-framework C, arranged to be supported upon the rear end of the tongue D. This portion of the tongue is carried backward, somewhat enlarged, and formed of a center and the two side pieces $d$ and $e$, upon which the hoppers and feed mechanism are carried, and at their rear ends they are united by a bar, to which the link $f$ is pivotally secured at its lower end and which has its upper end pivoted to the short end of the lever E. The lever E is mounted upon the pin F, which is carried in the body of the segment $g$ upon the seat-supporting frame G, and the usual toothed edge $h$ is provided at the upper curved edge of the segment to engage with a dog connected with the lever E. By this means the rear end of the auxiliary frame, which comprises the bifurcated portion of the tongue, is adjustably secured to the rear axle, as it will be seen the segment $g$ is mounted upon the seat-frame, which is journaled at its lower end upon the axle.

The potatoes are carried in the hopper H, from whence they are taken by the action of the feed-chain I, as shown in Fig. 2. This chain is carried upon the sprocket-wheels $i j$, mounted upon the shafts $k l$. The first-named shaft is journaled in the frame J, which is carried at the upper ends of the feeding-tube K and frame L, both of which rise from the auxiliary frame and are supported thereby, while the latter shaft is journaled in the side pieces $d$ $e$ of the auxiliary frame. These sprocket-wheels are so located with reference to the hopper H and the feeding-tube K as to cause the sprocket-chain carried thereon to pass upward when operated through the hopper, along the inner wall $m$ thereof, and down along the outside of the wall $n$ of the feeding-tube. This sprocket-chain is provided at intervals with carriers $q$, which are so constructed as to carry the potatoes out of the hopper H over the sprocket-wheel and deposit them in the feeding-tube K, which is accomplished by virtue of the inward-projecting tongue $o$, arranged to pass between the two side portions of the carrier, so that the potato will be caught as it leaves the carrier and directed into the feeding-tube. A similar tongue is employed at $p$ in the bottom of the hopper H, also extending inward, so that the chain may be permitted to pass freely within the hopper, and yet the potatoes are held from escaping therefrom. Upon the opposite side, as seen in Fig. 1, I provide a fertilizer-hopper M, secured to the feeding-tube and frame L and having an opening in the bottom which leads to the feeding-tube K. In Fig. 2 this connection is shown at N, which enters the feeding-tube at $r$. The feeding mechanism employed in connection with this portion of the device is similar to others commonly in use, consisting of the toothed wheel P, (shown in Fig. 4,) arranged to be rotated at the lower end of the hopper. At the bottom of the feed-tube, which extends downward to within a short distance of the ground, there is provided an opening s. At its rear and upon the sides of the tube the trap t is pivoted, having its lower end arranged to extend within the tube through the opening and to close into the passage therefrom, thus retaining all seed or potatoes that may be dropped within the tube until the trap is opened, when they are dropped to the ground. The other end of this trap is connected at u to the bar R, which extends forward and is pivoted to the lower end of the rock-lever S. This rock-lever is mounted upon the horizontal shaft T, journaled in bearings v at either end of the cross-frame C, one of which is seen in Fig. 1. The upper end of the lever S is connected to the coil-spring U, which has its opposite end secured at w upon the tongue. The spring is adapted to draw upon the upper end of the lever and hold the trap normally in its closed condition, at the same time to give freely as the shaft T is rotated, causing the rock-lever to open the trap through the medium of the rod R. Thus far it will be evident that as the carriers are operated the potatoes are delivered into the feeding-tube upon the trap, which may be operated at intervals to produce a row of hills, or, as will be seen, the trap may be removed, whereupon the potatoes will be dropped to the ground in drill form. I provide a simple means for hilling, which consists of a knotted wire W, stretched across the entire field and guided upon a spool at the end of the cross-frame C. The knots in the wire are spaced from each other in proportion to the spacing desired in the hills. If desired, the spool of knotted wire W' may be carried upon the end of frame V. As the structure and operation of these spools are identical at both ends of the cross-frame, I have deemed it sufficient to show and describe the one seen in Fig. 1.

The wire W leads over the forked end of the lever Y, which has its lower end secured to the shaft T, above described, and as the planter is driven across the field, assuming the free end of the wire to have been fastened, the knot y will engage the bifurcated end of the lever and force it backward until it reaches an angle of about forty-five degrees, whereupon the knot will slip over the end of the lever, which will immediately be forced to assume its original position by means of the spring U. By this means, it will be observed, the trap-door t may be operated at any time to drop the seed.

The feeders are operated by means of the sprocket-chain a', which connects with the sprocket-wheel b' upon the main axles c' and upon the axle l, and, as will be evident, the ratio of these wheels may be altered so as to cause the feeders to travel faster or slower in proportion to the travel of the main wheel A', thus altering the feed to suit the desire of the operator. As a further means which may be employed, if desired, for regulating the distribution of the seed I provide the toothed wheel B' upon the outer end of the shaft l, and the link C', pivoted to the upper end of the rock-lever S, arranged to engage therewith. As shown, this link comprises two members united at their lower ends by means of the pin D', which is adapted to rest upon the edge of the wheel, so as to engage with the teeth thereof. It will be manifest that as the shaft T is rotated, causing the lever S to rock, the link C' will engage the teeth upon the wheel B', causing it to be rotated to a degree equal to the travel of the rock-lever, thus producing a movement of the feeders of any degree in accordance with the proportions of the toothed wheels and operating mechanism.

In cases where it is desired to distribute the seed in drilled rows the link connection C' and trap t are removed, and upon the counter-shaft d' I provide the combined sprocket-wheel and gear e', the gear f' being shown in dotted lines in Fig. 3. This gear f' is arranged to mesh with the gear g' upon the shaft l, and the sprocket-wheel, which is formed integral with the gear f', is connected to the sprocket-wheel b' by means of the lengthened chains g. This idler e' is provided for the purpose of keeping the correct motion to the shaft l and also to provide convenient means by which the speed of the feed mechanism can be regulated and controlled.

Upon the shaft F', which carries the fertilizer-roller, there is secured a sprocket-wheel G', (shown in dotted line in Fig. 2,) and this sprocket-wheel is connected by means of the sprocket-chain H' to the wheel I' upon the left-hand end of the shaft l, so that the machine is operated to cause the seed to be deposited into the feeding-tube, and a suitable quantity of fertilizer is also deposited.

Below the auxiliary frame and connected therewith at k' I provide the shoe L', bifurcated at its rear end M' to receive the lower end of the feed-tube. This shoe acts to provide a furrow for the reception of the seed, and as the machine passes the potatoes are covered by the scrapers N', which extend downward from the rear end of the auxiliary frame to a suitable position back of the furrowing attachment. The rear of the shoe is fixed to the lower end of the feeding-tube, so that when the mechanism is raised and lowered by means of the lever E the shoe is also operated, thus rendering it possible to plant the seed deep or shallow, as desired.

At R', I have shown a clutch engagement which is normally held in its working position by means of the coil-spring S', turned around the axle, and which holds the hub s' of the sprocket-wheel b' into engagement with a collar t', fixed upon the shaft. Any suitable means for throwing this clutch into and out of engagement may be employed. This construction and mode of operating the clutch is not new, and for that reason I have not deemed it necessary to illustrate or describe it.

From the foregoing the operation of my device may be clearly understood, and I desire to state that although I prefer the general construction and arrangement shown other means may be adopted whereby substantially the same results are accomplished without departing materially from the spirit and scope of my invention.

Having thus described my invention, what I claim is—

In a potato-planter, the combination of the main axle and wheels, a frame journaled upon said axle, an auxiliary frame adjustably secured at its rear end to said axle and hinged to the forward end of said frame, a cross-frame at the forward end of the said auxiliary frame, a horizontal shaft journaled in bearings at the ends of the said cross-frame, hoppers secured upon said auxiliary frame, sprocket-wheels journaled at the upper and lower ends of the said hoppers, sprocket-wheels and carriers adapted to travel over said sprocket-wheels, a feed-tube supported upon said auxiliary frame arranged adjacent to said sprocket-chain and carriers, means whereby said potatoes are carried from one of the hoppers into said feed-tube, a toothed roller in the other of the said hoppers adapted to feed the fertilizer, and means for conveying said fertilizer into said feed-tube, a spool of knotted wire carried upon the ends of the said cross-frame adapted to engage the lever secured to the opposite ends of said horizontal shaft, a trap at the lower end of the said feed-tube, and means connecting said trap with said horizontal shaft, whereby the engagement of the said knotted wire and lever actuates said trap to open it, and means for closing said trap substantially as described.

In testimony whereof I affix my signature in presence of two witnesses.

WALTER V. HART.

Witnesses:
W. S. JONES,
CHAS. WALSH.